United States Patent Office 3,408,321
Patented Oct. 29, 1968

3,408,321
MOISTURE CURABLE SILOXY TERMINATED POLYETHERS
Bruce A. Ashby, Schenectady, N.Y., assignor to General Electric Company, a corporation of New York
No Drawing. Filed June 14, 1965, Ser. No. 463,877
7 Claims. (Cl. 260—37)

ABSTRACT OF THE DISCLOSURE

Compositions curable at room temperature, comprising an organic polymer, such as polyether having terminal silylurethane groups with hydrolyzable radicals, such as acyloxy radicals attached to silicon. A method for making the organic polymer with terminal silylurethane groups also is provided, involving the addition of a silicon hydride to an organic polymer having terminal olefinic unsaturation. The curable compositions are useful as sealants and caulking compounds.

---

The present invention relates to room temperature curable compositions comprising an organic polymer having terminal silylurethane groups with hydrolyzable radicals attached to silicon.

Prior to the present invention various one package room temperature vulcanizing organopolysiloxane compositions, such as shown by Bruner Patent 3,032,532 were utilized in a variety of applications. Although cured products resulting from these compositions provide for the production of materials possessing many of the desirable characteristics of conventional organopolysiloxane elastomers, such as heat stability, low temperature flexibility, etc., these cured products often lack toughness, and resistance to the effects of organic solvents. Some product improvements have been achieved with room temperature vulcanizing materials in the form of isocyanate-terminated polymers as shown in British Patent 971,692. Experience has shown however, that isocyanate-terminated polymers can be highly toxic materials. Their relatively long tack-free time prior to cure has increased the risk of isocyanate poisoning which can be significant when isocyanate polymer is contacted with the skin. As a result, extreme care must be utilized in applications requiring the handling of these materials in the form of uncured shaped polymer sections.

The present invention is based on the discovery that certain organic polymers such as polyglycols and polyesters having terminal silylurethane groups with hydrolyzable radicals attached to silicon such as acetoxy, ketoximato, halogen, etc., provide for the production of room temperature vulcanizing compositions curable to elastomeric products having valuable characteristics. These room temperature vulcanizing compositions can be readily shaped and have a relatively short tack-free time. The cured products also possess improved toughness and resistance to swell when contacted with various organic solvents.

Included by the curable compositions of the present invention are compositions comprising polymer having terminal silylurethane groups of the formula, (1)
$$Y_{3-a}SiQNH\overset{O}{\overset{\|}{C}}(O)_b$$

selected from, (a) polyglycol consisting essentially of chemically combined units of the formula, (2)    R'O and
(b) polyester consisting essentially of chemically combined units of the formula, (3)
$$R'O\overset{O}{\overset{\|}{C}}R'\overset{O}{\overset{\|}{C}}O$$

where Y is a member selected from acyloxy radicals, ketoximato radicals and halogen radicals, R is a member selected from monovalent hydrocarbon radicals and halogenated monovalent hydrocarbon radicals, R' is a member selected from divalent hydrocarbon radicals and halogenated divalent hydrocarbon radicals, Q is a member selected from, a divalent cycloalkane radical, $$CR''_2CR''(H)(R''')_c$$

and $$|CR''_2CR''(H)R'Z\overset{O}{\overset{\|}{C}}NH|_dW$$

where R" is a member selected from hydrogen and alkyl radicals, R''' is a member selected from R' radicals and R'OR', Z is a member selected from —NR"—, —O— and —S—, W is a polyvalent radical having a valence of 2 or 3 selected from hydrocarbon radicals and halogenated hydrocarbon radicals, a is a whole number equal to 0 to 2, inclusive, b and c are whole numbers equal to 0 or 1, d is an integer equal to 1 or 2, and equal to one less than the valence of W.

Radicals included by R of Formula 1 are for example, aryl radicals, and halogenated aryl radicals, such as phenyl, chlorophenyl, naphthyl, etc., aralkyl radicals, such as benzyl, phenylethyl, etc.; aliphatic, haloaliphatic, and cycloaliphatic, such as alkyl, for example, methyl, ethyl, propyl, butyl, hexyl, heptyl, octyl; haloalkyl, such as trifluoropropyl, fluorobutyl; cycloalkyl, such as cyclobutyl, cyclohexyl. Radicals included by R' are alkylene, for example, methylene, ethylene, trimethylene; haloalkylene such as chloroisopropylene, fluorobutylene, etc., arylene such as phenylene, naphthalene, etc., haloarylene such as chlorophenylene, etc. Radicals included by R" are hydrogen and all of the aforementioned alkyl radicals included by R, R''' includes R' radicals; alkyleneoxyarylene radicals such as ethyleneoxyphenylene, etc.; alkyleneoxyalkylene such as ethyleneoxypropylene, etc., aryleneoxyarylene such as phenyleneoxyphenylene, etc. Radicals included by W and R' radicals and trivalent radicals such as

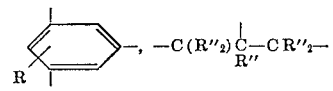

etc. Radicals included by Y are for example, chloro, bromo, fluoro; formoxy, acetoxy, propionoxy, butyroxy, etc.; ketoximato, such as methylketoximato, dimethylketoximato, ethylbutylketoximato, etc. Divalent cycloalkane radicals included by Q of Formula 1 are divalent radicals of cycloalkanes having from 3 to 10 carbon atoms such as divalent cyclopropane, divalent cyclobutane, divalent cyclopentane, divalent cyclohexane, etc. In the above formulae, where R, R', R", R''', W, and Z can represent more than one radical respectively, these radicals can be all the same or any two or more of the aforementioned radicals.

The organic polymer having terminal silylurethane groups of Formula 1, can be made by effecting addition between a silicon hydride of the formula, (4)

and an organic polymer consisting essentially of chemically combined units of Formula 2, or Formula 3, having terminal olefinically unsaturated urethane linkages of the formula, (5)

where Q' is a member selected from a cycloalkenyl radical having from 3 to 10 carbon atoms, $CR''_2=CR''(R''')_c$ and

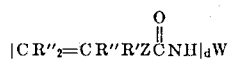

where R, R', R'', R''', Z, W, $a$, $b$, $c$ and $d$ are as defined above. Cycloalkenyl radicals included by Q' are cyclopropenyl, cyclobutenyl, cyclopentenyl, cyclohexenyl, cycloheptenyl, etc.

One method of preparing the organic polymer having terminal linkages of Formula 5 is by effecting reaction between olefinically unsaturated isocyanate of the formula, (6)
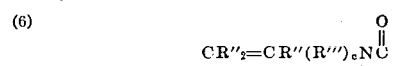

and polyether consisting essentially of chemically combined units of Formula 2, or polyester consisting essentially of chemically combined units of Formula 3. The preferred method for making organic polymer having terminal linkages of Formula 5, is by contacting polyether or polyester within the scope of the invention with polyisocyanate having the formula, (7)

The resulting isocyanate-terminated organic polymer can be further reacted with an olefinically unsaturated compound of the formula, (8)    $CR''_2=CR''R'ZH$ resulting in the production of polymer having terminal linkages included by Formula 5, where the various terms employed in Formulae 6, 7, and 8 are as previously defined.

Some of the polyglycols and polyesters which can be employed as organic polymer in making the curable compositions of the invention are well known and are commercially available. The polyester and polyglycol have terminal hydroxy radicals to provide for the formation of groups shown in Formula 1. Typical of the polyglycol which can be utilized is taught on pages 32 through 44 of Polyurethanes Chemistry and Technology, J. H. Saunders and K. C. Fritch, Interscience Publishers, New York (1962). Polyglycol which can be employed can be made from source materials such as ethylene oxide, propylene oxide, epichlorohydrin, tetrahydrofuran, etc. For example, one procedure which can be used is to effect reaction between propylene oxide, epichlorohydrin, etc., and an alkylene glycol, such as propylene glycol, or a fluorinated alkylene glycol, etc. in the presence of a base catalyst, such as anhydrous sodium hydroxide. Some of the chemically combined units which are included by Formula 2 are for example,

$CH_2CF_2CF_2CH_2O-$, $C_nH_{2n}O$ etc., where $n$ is an integer equal to 2 to 6, inclusive, and preferably 2 to 4. Of the polyalkylene glycol, polypropylene glycol is preferred. Polyglycol having a molecular weight of between 300 to 12,000, and preferably 1,000 to 2,000 can be utilized. Viscosities up to $2\times 10^6$ centipoises at 25° C. can be employed in the practice of the invention.

Polyester which can be utilized in the practice of the invention consisting essentially of chemically combined units of Formula 3, can be linear or branched. The polyester can be produced by effecting reaction between a polycarboxylic acid and a polyglycol. The polyester can have terminal radicals selected from hydroxy radicals or a mixture of hydroxy and carboxy radicals. Some of the polycarboxylic acids which can be employed, in making the polyesters operable in the invention are oxalic acid, malonic acid, succinic acid; glutaric acid, adipic acid, palmitic acid, suberic acid, azelaic acid, sebacic acid, phthalic acid, isophthalic acid, terephthalic acid, halogenated phthalic acid, etc. Glycols which can be employed to make the polyesters utilized in the practice of the invention include 1,4-butanediol, 1,4-cyclohexanedicarbonol, ethylene glycol, diethylene glycol, triethylene glycol, etc., propylene glycol, 1,3-butylene glycol, 1,4-butylene glycol, isomers of dihydroxybenzene, bis-phenols, such as diphenyolpropane, halogenated bis-phenols, etc. Mixtures of glycols and triols, such as glycerine, 1,2,6-hexanetriol, trimethylolpropane, pentaerythritol, etc., also can be employed in combination with any one or more of the aforementioned acids. Esterification and transesterification methods for making these polyesters are well known. A method which can be employed is described on pages 45–48 of "Polyurethanes Chemistry and Technology" as previously cited. Organic polymer having terminal hydroxy radicals, or a mixture of hydroxy and carboxy radicals also can be employed consisting of blocks of polyglycol, polyester or mixtures thereof joined by urethane linkages.

Silicon hydrides included by Formula 4 are for example, acyloxysilane such as

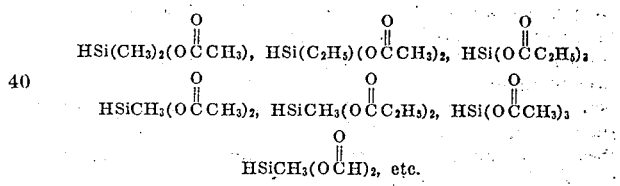

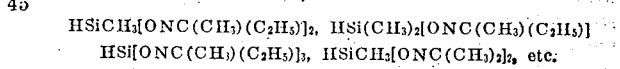

ketoximatosilanes such as,

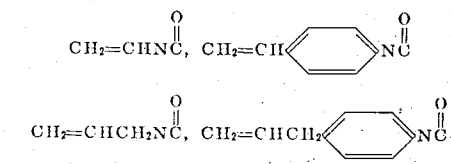

halosilanes, such as $HSiCl_3$, $(CH_3)_2HSiCl$, $CH_3HSiF_2$, $CH_3HSiCl_2$, $CH_3HSiBr_2$, etc.

Olefinically unsaturated isocyanates included by Formula 5 are for example,

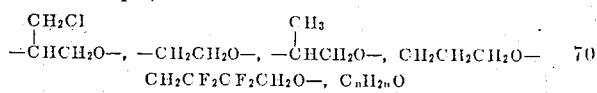

Polyisocyanates included by Formula 7 are for example,

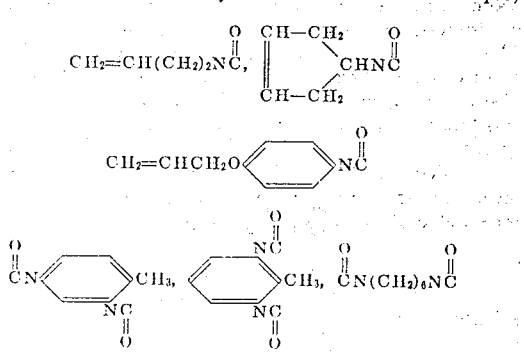

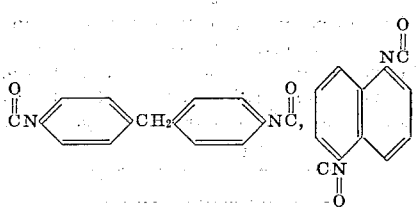

Olefinically unsaturated compounds included by Formula 8 are for example, allyl alcohol, allyl mercaptan, allylamine, p-allylpheno, p-aminostyrene, etc.

In accordance with the practice of the invention, the curable compositions are made by a stepwise procedure. Reaction is initially effected between the "organic polymer," which will hereinafter signify either the polyglycol or polyester, unless specifically identified otherwise, and an isocyanate shown by Formula 6 and 7. The employment of olefinically unsaturated isocyanate of Formula 6 provides for the direct production of organic polymer having terminal olefinically unsaturated linkages included by Formula 5. The curable compositions of the present invention are thereafter provided by the addition thereto of a silicon hydride included by Formula 4. In instances where polyisocyanate of Formula 7 is utilized in combination with the organic polymer, organic polymer having terminal olefinically unsaturated linkages can be made by further contacting the isocyanato-terminated organic polymer with olefinically unsaturated compound shown by Formula 8. The addition of silicon hydride of Formula 4 to terminal olefinic unsaturation of the resulting polymer can thereafter be effected in the presence of a platinum catalyst.

It has been found that reaction between the organic polymer and isocyanate can be facilitated with the use of a catalyst such as dibutyltindilaurate, stannous octoate, etc. Temperatures between 20° C. to 200° C. can be employed and preferably temperatures between 90° C. to 120° C. Experience has shown that at least two moles of isocyanate, per mole of hydroxy radicals of the polyglycol, or per mole of the sum of the mole of hydroxy radicals and available carboxy radicals of the polyester will provide for effective results.

Addition of silicon hydride to the organic polymer having terminal olefinically unsaturated linkages can be effected at temperatures in the range of between 20° C. to 200° C. The addition is preferably accomplished in the presence of a platinum catalyst, for example, in the form of a platinum-olefin complex as shown in Ashby Patent 3,159,601, assigned to the same assignee as the present invention, or platinum metal on a finely divided inert carrier, chloroplatinic acid, etc.

Experience has shown that the curable compositions of the present invention can remain stable for at least 6 months or more at a temperature in the range of between 0° C. to 100° C., if there are present no more than 100 parts of water, per million of composition. Well known procedures can be employed to minimize the presence of water in the final composition. For example, the ingredients such as polyester can be dried by azeotroping out water by use of toluene, etc. Mixing of the ingredients can be performed under an inert gas atmosphere such as nitrogen, etc.

The curable compositions of the present invention can contain curing accelerators, such as stannous octoate, dibutyltindilaurate, stannous oleate, which can be utilized in amounts of about 0.001 percent to 10.0 percent, by weight of composition. Fillers also can be utilized in proportions up to about 50 parts of filler per 100 parts of composition. For example, filler such as carbon black, diatomaceous earth, fumed silica, etc., can be employed. Reinforcing materials, such as silicon carbide whiskers, glass fibers, etc., can be utilized. In addition, pigments, heat stabilizers, plasticizers also can be employed.

The curable compositions of the present invention can be utilized in sealing and caulking applications, in roof construction, as an encapsulating and potting compound, etc.

In order that those skilled in the art will be better able to practice the present invention, the following examples are given by way of illustration and not by way of limitation. All parts are by weight.

Example 1

There were added at 100° C., 100 parts of a polyethylene-polypropylene glycol having a molecular weight of about 2,066 to a mixture consisting of 15.6 parts of 1,6-hexamethylenediisocyanate and 0.05 part of dibutyltindilaurate. The ingredients of the resulting mixture were allowed to react for 4 hours at a temperature between 100° C. to 113° C. The infrared spectrum of a sample of the mixture showed that it was free of hydroxyl radicals. There were then added to the mixture, 10.8 parts of allyl alcohol while the mixture was maintained at 114° C. The mixture was stirred for 1 hour at a temperature between 114° C. to 124° C. Infrared established that the mixture was free of isocyanate. Excess allyl alcohol was removed by vacuum stripping at a temperature to 100° C. at 4 mm. pressure. There were then added to the mixture under a nitrogen atmosphere 15 parts of methyldiacetoxysilane and 0.002 part of platinum in the form of a platinum-ethylene complex while the mixture was maintained at 100° C. for an additional hour. The resulting mixture was then poured onto a tin plate. In less than two hours under atmospheric conditions the surface of the mixture was tack-free. After 3 days, a cured sheet was obtained having a thickness of about 100 mils. A slab cut from the sheet showed it had valuable elastomeric and insulating properties; it was transparent and slightly amber in color.

Example 2

There were added at 80° C., 6.37 parts of allyl alcohol to a solution of a polyester which had been previously dried having a molecular weight of about 1,000. The polyester was produced by reacting adipic acid and diethylene glycol and chain-terminated with 2,4-toluenediisocyanate. The mixture was heated until a vapor phase chromatograph showed it was free of allyl alcohol. There was then added 0.005 part of platinum as utilized in Example 1 followed by 18 parts of methyldiacetoxysilane. The mixture was heated for an additional 45 minutes between 80° C. to 106° C. There was then added 0.10 part of dibutyltindilaurate. Fifty parts of the mixture was then poured onto a tin plate and allowed to cure under atmospheric conditions at 50% relative humidity. A tack-free product was obtained in less than two hours. After 3 days a cured sheet was obtained having a thickness of approximately 100 mils. A slab cut from this sheet showed it had valuable elastomeric and insulating properties.

Example 3

A mixture of 100 parts of a polyglycol having a molecular weight of about 2900 and 57.3 parts of allyl isocyanate were heated to 80° C. The polyglycol was made by effecting reaction between ethylene oxide and polypropylene glycol. There was added to the mixture 0.6 part of stannous octoate; the mixture was heated at 80° C. for about 1 hour. There was added under a nitrogen blanket 0.002 part of platinum in the form of a platinum-ethylene complex, per 100 parts of mixture. There were added 12.3 parts of methyldiacetoxysilane while the mixture was maintained at a temperature of 50° C. The mixture was heated for an additional hour at 80° C. It was then poured onto a tin tray under atmospheric conditions. In less than 2 hours a tack-free product was obtained. After 4 days a sheet formed having a thickness of 86 mils; it showed 42 hardness (Shore A), 69 tensile (p.s.i.), and 122 elongation (percent).

Example 4

There were added at a temperature of 45° C., 32.8 parts of allyl isocyanate to 400 parts of polyester. The polyester was a reaction product of adipic acid and diethylene glycol and had a molecular weight of about 2020. The resulting mixture was heated for 5 hours at 100° C. There was added 0.008 part of platinum to the mixture in the form of chloroplatinic acid. The mixture was heated to 55° C. and 32.4 parts of diacetoxymethylsilane was added all at once. The mixture was then heated to 100° C. for 3 hours. A tack-free product was obtained in less than two hours by pouring the mixture into an aluminum dish and exposing it to atmospheric conditions. After 3 days, a cured sheet was obtained. A slab cut from the sheet showed a tensile of 113 (p.s.i.) and an elongation of 16 (percent).

Example 5

There were added 14.7 parts of allyl isocyanate to 200 parts of polyglycol which had been previously dried by the removal of a water-toluene azeotrope. The polyglycol was produced by effecting reaction between propylene oxide and a glycerine in the presence of potassium hydroxide. The isocyanate glycol mixture was heated to 100° C. until a sample removed from the mixture had an isocyanate-free infrared spectrum. There were then added under a nitrogen atmosphere, 28.7 parts of diacetoxymethylsilane and 0.004 part of platinum in the form of the catalyst utilized in Example 1. The mixture was heated for an additional half hour and stripped to 120° C. at 4 mm. The mixture was then allowed to cool to 30° C. and 0.10 part of dibutyltindilaurate was stirred into the product. The mixture was poured onto a tin tray and exposed to the atmosphere; it was tack-free in less than 30 minutes. The cured sheet showed valuable elastomeric and insulating properties.

Example 6

A mixture of 200 parts of polyester prepared from 1,3-butyleneglycol and adipic acid and 11 parts of allyl isocyanate was heated at 100° C. for 4 hours. There was added to the mixture while utilizing a nitrogen atmosphere, 0.004 part of platinum followed by 21.5 parts of diacetoxymethylsilane. The mixture was then stripped to 115° C. at 4 mm. There was then added 0.10 part of dibutyltindilaurate and the product was poured onto a tin plate. It was allowed to cure under atmosphere conditions. It showed a tack-free time of less than 2 hours. After 6 days a cured sheet was obtained having valuable elastomeric and insulating properties.

Example 7

There were added to 100 parts of a polyglycol having terminal diacetoxymethylsilylurethane groups and a viscosity of 1500 centipoises at 25° C. 10 parts of fumed silica and 0.04 part of stannous octoate. The polymer was made by adding 230.7 parts of allyl isocyanate to a mixture of 3,000 parts of a polyethylene glycol-terminated polypropylene glycol having a molecular weight of 2,066. The addition was performed at a temperature between 105° C. to 110° C. The mixture was heated until the infrared spectrum of a sample of the mixture showed it was free of isocyanate. There was then added at a temperature between 105° C. to 110° C. 0.27 part of platinum-ethylene complex followed by 150 parts of methyldiacetoxysilane.

A blend of 25 parts of fumed silica, per 100 parts of the above diacetoxymethylsilylurethane-terminated polypropylene glycol also was prepared following the above procedure. The final product had a viscosity of 185,000 centipoises at 25° C. The filled mixtures (A) containing 10 parts of fumed silica, and (B) containing 25 parts of fumed silica were poured onto a tin plate and allowed to cure under atmospheric conditions. The mixtures were found to be transparent and tack-free in less than 2 hours. After 8 days slabs were cut from the transparent cured sheets obtained from (A) and (B). The following results were obtained, where "H" is hardness (Shore A), "T" is tensile (p.s.i.), and "E" is elongation (percent).

TABLE I

|   | H | T | E |
|---|---|---|---|
| A | 45 | 274 | 63 |
| B | 57 | 525 | 80 |

Example 8

There were added 10 parts of fumed silica to 100 parts of a polyethylene glycol-terminated polypropylene glycol having terminal methyldiacetoxysilylurethane groups and a viscosity of 88,000 centipoises at 25° C. Another blend was made containing 20 parts of fumed silica per 100 parts of the polyglycol. The silylurethane-terminated polyglycol was prepared by adding 657.5 parts of 2,4-toluenediisocyanate to 2500 parts of polyethylene glycol-terminated polypropylene glycol having a molecular weight of 2,066 while maintaining the temperature during the addition at 100 to 105° C. After 1 hour at 100° C. infrared showed that the mixture was free of hydroxyl radicals. There was added to the mixture 0.4 part of dibutyltindilaurate followed by 218.8 parts of allyl alcohol. The mixture was heated until infrared showed an absence of isocyanate. There was then added 0.05 part of platinum in the form of a platinum-ethylene complex followed by 611.3 parts of methyldiacetoxysilane. After heating the mixture for an hour at 100° C. an infrared spectrum of a sample of the mixture indicated that it was free of silicon hydride. There was added to the blend of filler and silylurethane-terminated polyglycol 0.04 part of stannous octoate, per 100 parts of polyglycol. The mixture was then poured onto a tin plate and allowed to cure under atmospheric conditions. In less than 2 hours the surface of the mixture was found to be tack-free. The following table shows the results obtained where (A) is the blend having 10 parts of fumed silica per 100 parts of the polyglycol, and (B) is the blend having 20 parts of fumed silica per 100 parts of glycol, and H, T, and E are as defined in Example 7.

TABLE II

|   | H | T | E |
|---|---|---|---|
| A | 42 | 455 | 186 |
| B | 53 | 959 | 183 |

Example 9

There were blended 10 parts of fumed silica with 100 parts of a polyester resulting from the reaction of adipic acid and diethylene glycol having a molecular weight of about 2020, and terminal diacetoxymethylsilylurethane groups. There was also utilized in the mixture 0.04 part of stannous octoate. Another blend was prepared utilizing the same materials containing 20 parts of filler per 100 parts of polymer.

The polyester having terminal silylurethane groups was prepared by adding 430 parts of 2,4-toluenediisocyanate to 2500 parts of polyester at a temperature of 100° C. The mixture was heated until infrared showed that it was free of hydroxyl radicals. There was then added to the mixture 0.4 part of dibutyltindilaurate and 145 parts of allyl alcohol. When an infrared spectrum of a sample of the mixture showed it was free of isocyanate, 0.05 part of platinum-ethylene complex, and 400 parts of methyldiacetoxysilane were added at a temperature between 100° C. to 105° C. An additional hour was required at 100° C. until infrared showed that the mixture was free of silicon hydride. There were then added 0.04 part of stannous octoate per 100 parts of polymer. The mixture was poured onto a flat aluminum sheet and exposed to the atmosphere. In less than 2 hours time the surface of the resulting product was tack-free. After 8 days a cured slab was obtained which showed valuable insulating and elastomeric properties.

Example 10

The procedure of Example 9 was repeated, except that 10 parts of carbon black were blended with 100 parts of the polyester having terminal diacetoxymethylsilylurethane groups. The resulting cured product had a tensile of 439 (p.s.i.), an elongation of 404 (percent) and a hardness (Shore A) of about 23.

Example 11

There were added 32.2 parts of allyl isocyanate to 204.8 parts of a polypropylene glycol having a molecular weight of 1010, followed by the addition of 0.06 part of dibutyltindilaurate. The mixture was heated at a temperature of 100° C. for 2 hours. An infrared spectrum of a sample of the mixture showed that it was free of hydroxyl groups. There was then added 0.08 part of platinum as a platinum-olefin complex and 84.4 parts of bis(methylethylketoximato)methylsilane. The mixture was maintained at a temperature of between 90° C. to 100° C. Infrared showed that the mixture was free of isocyanate. The mixture was then poured onto a flat tin plate and exposed to the atmosphere. In less than 2 hours the surface of the resulting product was tack-free. After 14 days, a sample was cut from the resulting cured sheet. It showed valuable elastomeric and insulating properties.

Example 12

There were added 40.4 parts of allyl alcohol and 0.06 part of dibutyltindilaurate to 200 parts of a reaction product of 2,4 - toluenediisocyanate and a polyester of 12-hydroxy - 9 - octadecenoic acid. The mixture was heated until the infrared spectrum of a sample of the mixture showed the absence of isocyanate. There were then added 112.8 parts of methyldiacetoxysilane, 0.04 part of platinum as chloroplatinic acid, and 0.10 part of stannous octoate. The mixture was poured onto a smooth metal surface and exposed to the atmosphere. In less than 2 hours the surface of the mixture was tack-free. After 8 days a slab was cut from the resulting cured sheet; its physicals were measured. The physicals of the cured product were again measured after 18 days, and after 25 days. The table below shows the results obtained after 8 days, 18 days, and 25 days, where tensile "T" and elongation "E" are as defined above.

TABLE III

| Days | T | E |
|---|---|---|
| 8 | 738 | 65 |
| 18 | 1,360 | 140 |
| 25 | 2,512 | 173 |

Example 13

The procedure of Example 8 was repeated, except that 20 parts of fumed silica were blended with the polyethylene-glycol-terminated polypropylene glycol having terminal methyldiacetoxysilylurethane groups. Another blend of the same polyglycol was made with 30 parts of carbon black, per 100 parts of polyglycol. The carbon black utilized was a fine-furnace carbon black having an average particle size of about 41 millimicrons and a surface area of about 65 square meters per gram.

Cured slabs were made from the compositions containing the fumed silica and carbon black, as well as a slab free of filler. Swell ratios of the various slabs were obtained by immersing the slabs for 5 days in Fuel B consisting of a mixture of 70 parts of isooctane and 30 parts of toluene, 3 days in ASTM No. 3 oil at room temperature, and 3 days in ASTM No. 3 oil at a temperature between 70° C.–75° C. Swell ratio is calculated by dividing the weight of the original slab into the weight of the solvent retained by the slab after the slab has been wiped free of surface solvent immediately upon removal from the bath.

TABLE IV

| Filler | Fuel B 5 Days at 25° C. | ASTM No. 3 Oil at 25° C. | ASTM No. 3 Oil at 70–75° C. |
|---|---|---|---|
| None | 0.5 | 0.03 | 0.16 |
| Fume Silica | 0.39 | 0.02 | 0.14 |
| Carbon Black | 0.38 | 0.03 | 0.14 |

The slab of the above composition filled with carbon black also shows a tensile of 832 (p.s.i.), an elongation of 243 (percent), and a hardness of 56 (Shore A).

In comparison with the results of Table IV showing a swell ratio of 0.5 or below for the cured compositions provided by the present invention, a swell ratio of 2.5 was obtained from a heat-cured polydimethylsiloxane elastomer free of filler which had been immersed in Fuel B for 5 days at 25° C.

Example 14

A polyester having terminal diacetoxymethylsilylurethane groups prepared by the procedure of Example 4 was blended with 30 parts of fumed silica filler, per 100 parts of polyester. Another polyester filler blend was made by utilizing 30 parts of carbon black having an average particle size of 22 millimicrons, a surface area of 120 square meters per gram and a pH of about 4.5. Slabs were cut from sheets of the cured compositions which were obtained by allowing the compositions to cure under atmospheric conditions for 3 days. The slabs were found to exhibit swell ratios which were superior to the swell ratios obtained from similar filled heat-cured polydimethylsiloxane.

Example 15

There were added 110 parts of allyl isocyanate to 1300 parts of a polyl(1,2 - propyleneglycol adipate) which had a molecular weight of about 2,000. The polyester had been dried previously by azeotroping it with toluene. The mixture was stirred at a temperature between 90° C. to 110° C. until it was free of isocyanate as determined by its infrared spectrum. There was then added 0.08 part of platinum in the form of chloroplatinic acid followed by 214.5 parts of methyldiacetoxysilane. The addition was performed at a temperature between 100° C. to 110° C. There was added to 145 parts of the resulting mixture 0.05 part of stannous octoate. The mixture was then poured onto a tin plate and exposed to the atmosphere. In less than 1 hour at a temperature of 25° C., the mixture was tack-free. A slab was cut from the resulting cured sheet after it had remained exposed to the atmosphere for about 5 days. The slab showed valuable elastomeric and insulating properties.

Example 16

There were added 230 parts of 2,4 - toluenediisocyanate to 1300 parts of the poly(1,2 - propyleneglycol adipate) of Example 15, at a temperature between 90° C.–100° C. There were also added to the resulting product 0.18 part of dibutyltindilaurate, and 76.7 parts of allyl alcohol. The mixture was heated at about 100° C. until it was free of isocyanate as determined by its infrared spectrum. There were then added to the resulting mixture 0.08 part of platinum as utilized in Example 1, followed by 214.5 parts of methyldiacetoxysilane. The temperature of the mixture was maintained at 100° C. until it was free of silicon hydride as determined by infrared.

There was added 0.04 part of stannous octoate to 265 parts of the above product. A portion of the above product was then poured onto a tin plate and allowed to cure under atmospheric conditions. It was found to be tack-free in less than 1 hour. After 5 days a slab was cut from the cured sheet which had formed; it showed a tensile of 218 (p.s.i.), an elongation of 139 (percent), a tear of 25.9 (p.i.), and a hardness of 40 (Shore A).

Based upon the above results, those skilled in the art would know that the room temperature curable compositions provided by the present invention have relatively short tack-free time compared to other room temperature vulcanizing compositions. In addition, the curable compositions of the invention exhibit superior resistance to oil swell as compared to heat-cured organopolysiloxane compositions. Further, that the compositions of the present invention comprising organic polymer made from polyisocyanate of Formula 7, show improved properties over compositions comprising organic polymer made from olefinically unsaturated isocyanate of Formula 6.

While the foregoing examples have of necessity been limited to only a few of the very many variables within the scope of the present invention, it should be understood that the present invention is directed to a much broader class of curable compositions comprising organic polymers having terminal urethane groups as shown by Formula 1. These organic polymers can be made by effecting contact between a polyglycol consisting essentially of chemically combined units of Formula 2 or a polyester consisting essentially of chemically combined units of Formula 3 with an isocyanate shown by Formulae 5, 6, or a cycloalkaneisocyanate followed by the addition to the resulting polymer having terminal urethane linkages with olefinic unsaturation of a silicon hydride of Formula 4, in the presence of a platinum catalyst. It is also understood that the present invention is directed to a method for making the curable compositions of the present invention involving the use of a variety of conditions included in the foregoing description as well as materials which can be utilized in combination with the organic polymer having terminal silylurethane groups consisting of one or two chemically combined silyl radicals $$Y_{3-a}\overset{R_a}{\underset{|}{Si}}$$

attached to a Q radical of Formula 1 by carbonsilicon linkages.

What I claim as new and desire to secure by Letters Patent of the United States is:

1. A composition comprising a polyether consisting essentially of chemically combined units of the formula, —R'O, which has a viscosity up to $2 \times 10^6$ centipoises at 25° C., a molecular weight between 300 to 12,000 inclusive, and terminal silylurethane groups of the formula, $$[Y_{3-a}SiQ|_dWNH\overset{O}{\overset{\|}{C}}(O)_b$$

where Q is a radical of the formula, $$C(R'')_2CR''(H)R'Z\overset{O}{\overset{\|}{C}}NH$$

which is attached to W of said silylurethane groups by a urethane linkage, where Y is a member selected from the class consisting of acyloxy radicals, ketoximato radicals and halogen radicals, R is a member selected from the class consisting of monovalent hydrocarbon radicals and halogenated monovalent hydrocarbon radicals, R' is a member selected from the class consisting of saturated divalent hydrocarbon radicals and halogenated saturated divalent hydrocarbon radicals, R'' is a member selected from the class consisting of hydrogen and alkyl radicals, W is a polyvalent radical having a valence of 2 or 3 selected from the class consisting of hydrocarbon radicals and halogenated hydrocarbon radicals, Z is a member selected from the class consisting of —NR''—, —O—, and —S—, $a$ is a whole number equal to 0 to 2 inclusive, $b$ is a whole number equal to 0 or 1, and $d$ is an integer equal to 1 or 2.

2. A composition in accordance with claim 1 in which the polyether is propylene polyether.

3. A curable composition comprising a polyether having terminal acetoxy silyl-urethane groups and consisting essentially of chemically combined ethylene oxide units and propylene oxide units.

4. A composition in accordance with claim 1 in which the filler is fumed silica.

5. A composition in accordance with claim 1 in which the filler is carbon black.

6. A method which comprises (1) effecting between a polyester consisting essentially of chemically combined units of the formula,

reaction in the liquid phase under an inert atmosphere at a temperature in the range between 20° C. to 200° C. between a polyether consisting essentially of chemically combined units of the formula R'O, and a polyisocyanate of the formula,

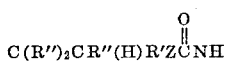

(2) effecting reaction between an olefinically unsaturated compound of the formula, $CR''_2=CRR'ZH$, and the product of (1), and effecting addition between silicon hydride of the formula, $$Y_{3-a}\overset{R_a}{\underset{|}{Si}}H$$

and the product of (2) in the presence of a platinum catalyst, where R is a member selected from the class consisting of monovalent hydrocarbon radicals and halogenated monovalent hydrocarbon radicals, R' is a member selected from the class consisting of saturated divalent hydrocarbon radicals and halogenated saturated divalent hydrocarbon radicals, R'' is a member selected from the class consisting of hydrogen and alkyl radicals, W is a polyvalent radical having a valence of 2 or 3 selected from the class consisting of hydrocarbon radicals and halogenated hydrocarbon radicals, Y is a member selected from the class consisting of acyloxy radicals, ketoximato radicals, and halogen radicals, Z is a member selected from the class consisting of —NR''—, —O—, and —S—, $a$ is a whole number equal to 0 to 2 inclusive, and $d$ is an integer equal to 1 or 2, and equal to one less than the valence of W.

7. A method in accordance with claim 6 which comprises (1) effecting reaction between a polypropylene ether and toluenediisocyanate, (2) effecting reaction between the product of (1), and allyl alcohol, and (3) effecting addition between the product of (2) and methyldiacetoxysilane in the presence of a platinum catalyst.

References Cited

UNITED STATES PATENTS 3,170,891  2/1965  Speier _____ 260—46.5

FOREIGN PATENTS 653,701  3/1965  Belgium.

ALLAN LIEBERMAN, *Primary Examiner.*

J. E. CALLAGHAN, *Assistant Examiner.*

UNITED STATES PATENT OFFICE
CERTIFICATE OF CORRECTION

Patent No. 3,408,321                          October 29, 1968

Bruce A. Ashby

It is certified that error appears in the above identified patent and that said Letters Patent are hereby corrected as shown below:

Column 12, lines 11 to 17, cancel "between a polyester consisting essentially of chemically combined units of the formula,

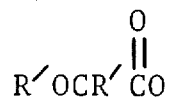

Signed and sealed this 10th day of March 1970.

(SEAL)
Attest:

Edward M. Fletcher, Jr.              WILLIAM E. SCHUYLER, JR.
Attesting Officer                         Commissioner of Patents